United States Patent
Rugheimer et al.

(10) Patent No.: US 10,207,933 B2
(45) Date of Patent: Feb. 19, 2019

(54) DEAERATED TALC AND RELATED METHODS

(71) Applicant: IMERYS TALC AMERICA, INC., Roswell, GA (US)

(72) Inventors: Peter Rugheimer, Bozeman, MT (US); Robert Beck, Ennis, MT (US); Dennis Paul Lester, Silver Star, MT (US)

(73) Assignee: Imerys Talc America, Inc., Roswell, GA (US)

( * ) Notice: Subject to any disclaimer, the term of this patent is extended or adjusted under 35 U.S.C. 154(b) by 442 days.

(21) Appl. No.: 14/761,475

(22) PCT Filed: Jan. 17, 2014

(86) PCT No.: PCT/US2014/012011
§ 371 (c)(1),
(2) Date: Jul. 16, 2015

(87) PCT Pub. No.: WO2014/113651
PCT Pub. Date: Jul. 24, 2014

(65) Prior Publication Data
US 2015/0344315 A1   Dec. 3, 2015

Related U.S. Application Data

(60) Provisional application No. 61/753,808, filed on Jan. 17, 2013, provisional application No. 61/773,561, filed on Mar. 6, 2013.

(51) Int. Cl.
*C01B 33/22* (2006.01)
*D21H 17/68* (2006.01)
*C09C 1/02* (2006.01)
*C09C 1/28* (2006.01)

(52) U.S. Cl.
CPC .............. *C01B 33/22* (2013.01); *C09C 1/028* (2013.01); *C09C 1/28* (2013.01); *D21H 17/68* (2013.01); *C01P 2004/61* (2013.01); *C01P 2006/10* (2013.01); *C01P 2006/11* (2013.01); *Y10T 428/1334* (2015.01); *Y10T 428/2982* (2015.01)

(58) Field of Classification Search
CPC ...... C01B 33/22; D21H 17/68; C01P 2004/61
USPC ......................................................... 524/445
See application file for complete search history.

(56) References Cited

U.S. PATENT DOCUMENTS

| | | |
|---|---|---|
| 3,935,306 A | 1/1976 | Roberts et al. |
| 4,277,415 A | 7/1981 | Sugerman et al. |
| 5,213,661 A | 5/1993 | Naddeo et al. |
| 5,827,917 A | 10/1998 | Fourty |
| 5,849,333 A | 12/1998 | Nordhauser et al. |
| 6,506,336 B1 | 1/2003 | Beall et al. |
| 6,908,675 B1 | 6/2005 | Bohach et al. |
| 7,198,653 B2 | 4/2007 | Lang et al. |
| 7,297,745 B2 | 11/2007 | Amidaiji et al. |
| 7,381,763 B2 | 6/2008 | Kikuchi |
| 7,815,996 B2 | 10/2010 | Yokota et al. |
| 2004/0048967 A1 | 3/2004 | Tomomatsu et al. |
| 2004/0116578 A1 | 6/2004 | Imanishi et al. |
| 2005/0171250 A1 | 8/2005 | Hayes |
| 2007/0260004 A1* | 11/2007 | Zanka ................... C08K 3/346 524/451 |
| 2010/0166967 A1 | 7/2010 | Fasano |
| 2011/0160373 A1 | 6/2011 | Bernreitner et al. |
| 2011/0308753 A1 | 12/2011 | Laleg et al. |
| 2012/0281932 A1 | 11/2012 | Rugheimer |

FOREIGN PATENT DOCUMENTS

| | | | |
|---|---|---|---|
| EP | 1 788 024 A1 | | 5/2007 |
| JP | 3241746 | | 12/2001 |
| JP | 2005-104794 | | 4/2005 |
| JP | 2005104794 A | * | 4/2005 |
| WO | WO 00/58389 | | 10/2000 |
| WO | WO 2010/150182 A1 | | 12/2010 |
| WO | WO 2014/113651 A2 | | 7/2014 |

OTHER PUBLICATIONS

Translation of JP 2005-104794, Apr. 21, 2005.*
International Search Report and Written Opinion dated Aug. 13, 2014, in PCT International Application No. PCT/US2014/012011, filed Jan. 17, 2014.
European Search Report dated Jul. 29, 2016 corresponding to EP Application No. 14741136.7 (8 pages).

* cited by examiner

*Primary Examiner* — Hui H Chin
(74) *Attorney, Agent, or Firm* — Finnegan, Henderson, Farabow, Garrett & Dunner LLP

(57) ABSTRACT

A deaerated talc may include micronized, talc powder having a Hegman rating of 4.0 or greater. A deaerated talc may include micronized talc powder having enough cohesive strength for form agglomerations measuring 100 millimeters or less, 75 millimeters or less, or 50 millimeters or less. A deaerated talc product may include a micronized talc powder, and a bag containing the deaerated talc. The micronized talc powder may be deaerated via application of force to the micronized talc powder in at least two directions, including a first direction substantially parallel to the longitudinal direction of the bag and a second direction.

23 Claims, 2 Drawing Sheets

DEAERATED TALC AND RELATED METHODS

CROSS-REFERENCE TO RELATED APPLICATIONS

This application is a U.S. national stage entry under 35 U.S.C. § 371 from PCT International Application No.PCT/US2014/012011, filed Jan. 17, 2014, which claims priority to and the benefit of the filing dates of U.S. Provisional Application Nos. 61/753,808 filed Jan. 17, 2013 and 61/773,561, filed Mar. 6, 2013, to all of which this application claims the benefit of priority, and the entirety of the subject matter of all of which is incorporated herein by reference.

DESCRIPTION

Field

The present disclosure relates to deaerated talc and related methods, and more particularly, to micronized, deaerated talc having improved dispersion properties and related methods.

Background

Talc is a hydrated magnesium silicate and is a naturally occurring mineral. Talc may be characterized as being either microcrystalline or macrocrystalline in nature. In particular, talc may generally be in the form of individual platelets. The individual platelet size of the talc (e.g., the median particle diameter as measured by the Sedigraph method) of an individual talc platelet (a few thousand elementary sheets) may vary from approximately 1 micron to over 100 microns, depending on the conditions of formation of the talc deposit. The individual platelet size may generally determine the lamellarity of the talc. A macrocrystalline talc may be a highly lamellar talc, which will have large individual platelets, whereas a microcrystalline talc will have small platelets. Although all talcs may be termed lamellar, their platelet size may differ from one talc deposit to another. Generally speaking, microcrystalline talc has small crystals, which provide a compact, dense ore. Macrocrystalline talc has large crystals in papery layers. In a microcrystalline structure, talc elementary particles are composed of small plates as compared to macrocrystalline structures, which are composed of larger plates.

Talc may be formulated with many different materials to serve different functions in the resulting, composite product. For example, micronized talc powder may be formulated into plastics, paints, paper, rubber, ceramics, agricultural products, food products, pharmaceuticals, cosmetics, and soap to achieve desired functional, processing, or reinforcing properties. However, talc powder may not easily disperse in the formulated product, which may lead to undesirable properties or defects in the resulting composite.

For example, micronized talc may be a valuable additive to a number of products due to its platy nature, good brightness, softness, and ability to nucleate semicrystalline polymers like polypropylene. For example, composites of micronized talc and polypropylene are widely used in automotive thermoplastics because they have good strength, are not abrasive, have fast molding cycles, and are easy to color match. However, many difficulties with mixing and compounding talc with polypropylene may be encountered. For example, micronized talc has a high surface energy and a low bulk density (e.g., less than 10 lbs/ft$^3$), it is very lubricious and fluffy, and may not be easily mixed with, for example, high viscosity molten polymers. For example, it is well known that low bulk density, fluffy materials like micronized talc may be difficult to mix with the polymer. The talc materials may be difficult to feed into an extruder, they may "float" on the surface of the polymer, and they may be excessively dusty. This may result in undesirably low throughput rates for making talc-containing products.

Attempts to address these drawbacks have been made by compacting the talc. For example, talc has been compacted by passing the talc between a gap between cylindrical rollers to compact the talc. However, such a process may result in subjecting the talc to very high pressures. For example, the talc maybe subjected to pressures ranging from 28,000 lbs/inch$^2$ (psi) to as much as 2,700,000 psi, depending on the size of the gap. Compacting the talc in this manner may result in talc having a much higher density and mixing much better with high viscosity resin. However, talc compacted in this manner may not disperse easily, which may result in talc containing composites having numerous manifestations of poor dispersion, including lower impact strength, white spots of agglomerated talc in the polymer matrix, and plugging of extruder screenpacks.

Therefore, it may be desirable to provide a ground, powdered talc that is more readily dispersed in a variety of formulated products which include talc powder.

SUMMARY

According to one aspect, a composition includes a deaerated talc made from micronized talc powder having a Hegman rating of 4.0 or greater. As used herein, the term "deaerated talc" does not include compacted or pelletized talc. Rather, "deaerated" relates to applying force to the talc powder in at least two directions. For example, deaerated talc may include micronized talc powder in which force has been applied in at least two directions, such that the talc is at least partially densified, and its density is increased to, for example, greater than 25 lbs/ft$^3$. In certain embodiments, deaerated talc products according to the present invention may have a density ranging from 25 to 75 lbs/ft$^3$ depending on the particle size and the degree of deaearation. According to some embodiments, deaerated talc may include compressed talc.

According to a further aspect, a dearated talc includes micronized talc powder having agglomerations measuring 100 millimeters or less, for example, 75 millimeters or less, or 50 millimeters or less. As used herein, "agglomerations" of talc includes clumps of cohesive talc powder. For example, agglomerations include both hard agglomerations and soft agglomerations of talc. Hard agglomerations may include clumps of powered talc that do not substantially fall apart when picked up or moved manually and require, for example, a mild compression or shear force applied to the hard agglomeration to break apart at least a portion of the clump of powdered talc. Soft agglomerations may include clumps of powdered talc that can be visually detected, for example, through a transparent or translucent bag or container containing the powdered talc, but which cannot be displaced manually or via tools without substantially falling apart.

Deaerated talc according to some aspects may be more readily dispersible in a number of formulated products. For example, deaerated talc powder may be more readily dispersible when mixed with plastics, paints, paper, rubber, ceramics, agricultural products, food products, pharmaceuticals, cosmetics, aqueous solutions, and soap, thereby achieving desired functional, processing, or reinforcement properties.

Figure 1:
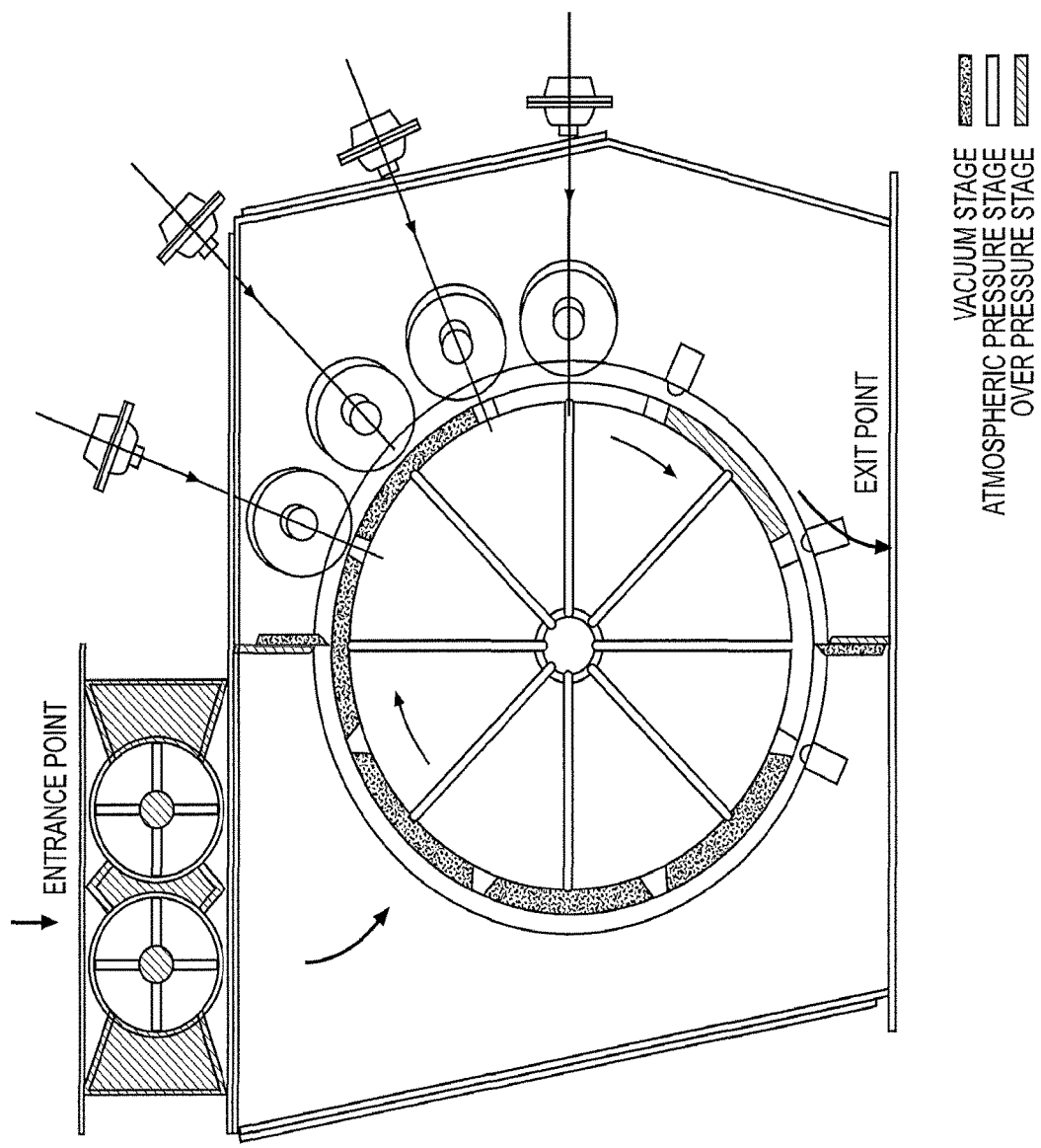
FIG. 1 is a schematic view of an example of a device for deaerating talc powder.

Additional objects and advantages of the disclosed embodiments will be set forth in part in the description which follows, and may be learned by practice of the embodiments. Objects and advantages of the embodiments may be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

According to some embodiments, a composition may include a deaerated talc including micronized talc powder having a Hegman rating of 4.0 or greater. For example, the deaerated talc may have a Hegman rating of 4.5 or greater, 5.0 or greater, 5.5 or greater, 6.0 or greater, 6.5 or greater, or 7.0 or greater. Hegman rating (ASTM D1210) is a common method of quantifying mineral or pigment dispersion via a Hegman gauge and measuring techniques. The Hegman measuring technique measures the largest particles present in a powder after the powder is dispersed in oil. A higher Hegman rating is indicative of better dispersion properties. According to some embodiments, the deaerated talc disclosed herein has an improved Hegman rating and dispersibility relative to other talcs.

Not wishing to be bound by theory, it is believed by the inventors that prior compacted talcs may suffer from poor dispersibility relative to at least some embodiments of deaerated talc disclosed herein as a result of the formation of interparticle bonds between talc particles that occur when, for example, talc powder is compacted at pressures in excess of 1,000 lbs/inch$^2$ (psi). Again not being bound by theory, it is believed that removal of air from the surface of the talc, and thereby easing the intrusion of fluids into the degassed voids, may contribute to the dispersibility of some embodiments of the deaerated talc. Yet again not wishing to be bound by theory, it is believed that at least a minimum internal cohesive strength is present in embodiments of the dearated talc to provide improved mixing in viscous polymers, while at maximum applied pressure the talc becomes compacted and exhibits poor dispersibility. Thus, certain embodiments of the dearated talc having good dispersibility may be characterized by this cohesive strength, rather than by the density of the talc. For instance, the dearated talc having a fine 1 micron median particle size and a density of 25 to 35 lbs/ft$^3$ may have a minimum cohesive strength, while a dearated talc having a 6 micron median particle size will not achieve this minimum cohesive strength below a density of 45 lbs/ft$^3$.

The compressed talc according to some embodiments includes talc that has been micronized (i.e., milled) to form talc powder and deaerated, such that the deaerated talc is at least partially densified, and its bulk density is increased to, for example, greater than 25 lbs/ft$^3$ (e.g., greater than 55 lbs/ft$^3$ or greater than 60 lbs/ft$^3$) or ranging from 25 to 75 lbs/ft$^3$. In another embodiment, the talc may be a ground talc powder.

According to some embodiments, the talc powder has been deaerated by applying force to the talc powder in at least two directions. When talc is deaerated by vacuum or pressure, an impermeable cake of talc may build up near the source of vacuum or pressure, which will slow down the deaeration and densification process. Thus, applying force to the talc powder from at least two directions may significantly improve the rate of the processing. For example, the talc powder may be deaerated via application of force to the talc in a first direction and a second direction, wherein the second direction is transverse to the first direction. For example, the second direction is substantially perpendicular to the first direction.

According to some embodiments, the deaerated talc may be manufactured in a variety of equipment; examples of the equipment include vacuum densifiers such as manufactured by Carman Industries in the USA and Pimi in Europe. In these devices, powder is conveyed horizontally with a screw while a vacuum force is applied on a filter cloth on the circumference of the conveyer. As the fine talc powder reaches the discharge end of the densifier, if the density is high enough that the talc powder becomes cohesive, then the screw has to apply a much greater horizontal force in excess of 1 atmosphere pressure and the powder is extruded out the end of the densifier with a high force. This is manifested by an increase in noise in the machine and an increase in the temperature of the powder. The manufacturers of the equipment do not recommend that the machine be operated in this mode as it may overload the motor and cause excessive wear, but we have found with talc that this mode of operation produces a deaerated product with excellent mixing and dispersion properties.

According to some embodiments, the talc powder may be deaerated on a rotary vacuum filter, and after a cake is formed, the cake can be further compressed by rollers applying pressure to the exposed side of the cake. This type of equipment is shown on FIG. 1.

According to some embodiments, the talc powder may be deaerated in a commercially available isostatic press. An isostatic press is a shape molding device used widely in the ceramic industry and there are many manufacturers of such equipment.

According to some embodiments, the forces may be applied to the talc powder while the talc powder is contained in a container (e.g., a flexible container or open container such as a bag).

According to some embodiments, the talc powder may be compressed at pressures less than 2,500 psi. For example, the talc powder may be compressed at pressures less than or equal to 1,500 psi. In certain embodiments, the talc powder may be dearated at pressures ranging from 1,000 psi to 1,500 psi. In other embodiments, the talc powder may be deaerated at pressures ranging from 14 psi vacuum to 250 psi. In still other embodiments, the talc powder may be deaerated at pressures ranging from 250 psi to 500 psi.

According to some embodiments, the deaerated talc includes micronized talc powder having agglomerations measuring 100 millimeters or less, for example, 75 millimeters or less, or 50 millimeters or less, with the measurement being taken in the direction of the longest dimension of the agglomeration. According to some embodiments, the agglomerations include hard agglomerations and/or soft agglomerations of talc. Hard agglomerations may include clumps of powered talc that do not substantially fall apart when picked up or moved manually and require, for example, a shear force applied to the hard agglomeration to break apart at least a portion of the clump of powdered talc. Soft agglomerations may include clumps of powdered talc that can be visually detected, for example, through a transparent or translucent bag or container containing the powdered talc, but which cannot be displaced manually or via tools without substantially falling apart.

According to some embodiments, the talc is a macrocrystalline talc. For example, the talc has a median particle size of less than 7 microns as measured via Sedigraph. In other embodiments, the talc has a median particle size of ranging from about 0.5 micron to about 5 micron. According to some embodiments, the talc is a microcrystalline talc. For example, the talc has a median particle size of less than 7 microns as measured via Sedigraph. For example, the talc has a median particle size of less than 2.0 microns (e.g., 1.9 microns) as measured via Sedigraph. In other embodiments, the talc has a median particle size of ranging from about 1 micron to about 5 microns.

According to some embodiments, the deaerated talc has an adsorbed moisture content of less than 1.0% by weight of the compressed talc. For example, the compressed talc has an adsorbed moisture content of less than 0.5% by weight of the compressed talc, less than 0.3% by weight or less than 0.2% by weight.

According to some embodiments, the deaerated talc may be dispersed in a polymer to form a composite when injection molded. The composite including the deaerated talc according to some embodiments, has an improved Charpy notch test result as compared to a polymer composite including compacted talc dispersed therein. The Charpy notch test, sometimes referred to as the "Charpy impact test," is a standardized high strain-rate test indicative of the amount of energy absorbed by a material during fracture. The absorbed energy is a measure of a given material's notch toughness.

According to some embodiments, the deaerated talc may be formulated into one or more commercially available copolymers, one or more commercially available stabilizers, and one or more commercially available lubricants, and processed, for example, via extrusion, and injection molding to form a polymer composite. According to some embodiments, these constituents may be formulated according to the following exemplary amounts: 79.7 wt % copolymer, 20 wt % deaerated talc, 0.2 wt % stabilizers, and 0.1 wt % lubricant (e.g., calcium stearate). The polymer compound may be formed via one or more extrusion passes. The resulting composite polymer including the deaerated talc according to some embodiments has an improved Charpy notch test result relative, for example, relative to a polymer compound having the same amount of other talcs dispersed therein. This may be an indication that the compressed talc has superior dispersion properties in the polymer relative to other talcs.

A polymer compound including the deaerated talc according to some embodiments has reduced white spots for example, relative to a blended polymer having the same amount of other talc products dispersed therein. White spots in the polymer compound are an indication of pockets or clumps of undispersed talc present in the polymer compound. Thus, a reduction in the white spots of the blended polymer is an indication that the deaerated talc has superior dispersion properties in the polymer relative to other talcs.

According to some embodiments, the deaerated talc may be dispersed in water without dispersants or an effective amount of chemical additives to form an aqueous talc slurry. This is surprising because talc is generally hydrophobic and as a result may be difficult to disperse in water in the absence of additives to promote dispersion of the talc in the water. According to some embodiments, the deaerated talc may be dispersed in water to create a stable aqueous slurry of the talc. According to some embodiments, the aqueous slurry of the talc may be applied to fruit (e.g., apples) to protect the fruit from undesirable pests and/or the environment. For example, applying the slurry of talc to fruit (e.g., via spraying) may be useful in reducing undesirable sunburn of the fruit.

According to some embodiments, the deaerated talc may be dispersed in an aqueous pulp furnish for making paper products, such as, for example, paperboard, tissue, and thermomechanical pulp (TMP). For example, the deaerated talc according to some embodiments provides equivalent performance in controlling pitch and stickies in pulp furnishes to conventional talc powder and compacted talc products. "Pitch" may refer generally to resinous materials released from wood during the pulping process. These resinous materials may stick to metal parts including the rolls and wires of a papermaking machine, and accumulation of pitch may stain the felts and canvas of the papermaking machine, and cause spotting and web breaks. "Stickies" may refer generally to sticky contaminants in recycled fiber pulp for forming paper products and may form from, for example, self-adhesive labels, envelopes, stamps, waxes, catalogue backings, and dissolved or colloidal substances. Stickies may form undesirable deposits on papermaking machine wires, felts, and rolls.

For example, for a paperboard furnish, an embodiment of the deaerated talc was formed into a slurry at 2% solids and added to paperboard furnish at an amount of 10 lbs/ton of furnish. The inventive deaerated talc showed an equivalent reduction in pitch and stickies deposits resulting from the paperboard furnish relative to a comparative talc. According to another example, for TMP, the inventive talc was formed into a slurry of 2% solids and added to TMP at amounts of 10 lbs/ton of furnish. The inventive deaerated talc showed an equivalent reduction in pitch and stickies deposits resulting from the TMP relative to a comparative talc. These exemplary test results show the equivalence of the inventive deaerated talc for controlling pitch and stickies relative to other talcs. Thus despite a more hydrophilic dispersion character, it performs similarly in pitch control function.

EXAMPLES

Example 1

Samples of a macrocrystalline talc ("Macro talc") and a microcrystalline talc ("Micro talc") were pressed in a Carver press at different pressures, dispersed in oil, and tested on a wide bar Hegman gauge to determine the respective Hegman ratings. The Macro talc sample was a high-purity, platy talc that had been mineralogically floated to remove carbonates and had the following properties prior to application of pressure: a BET surface area of 4.5 $m^2$/gram; a 325 Mesh of less than 1% retained; an average moisture content of less than 0.5 wt %; a loose bulk density of 21 lbs/$ft^3$; a tapped bulk density of 46 lbs/$ft^3$; a content of greater than 97% talc, less than 2% magnesite, and less than 1% chlorite as measured via X-ray diffraction; and a median particle size of 7.5 microns measured via Sedigraph and 13.5 microns measured via Malvern. The Micro talc sample was a high-purity, platy, ultra-fine talc that had the following properties prior to application of pressure: a BET surface area of 14 $m^2$/gram; a specific gravity of 2.8; a loose bulk density of 6 lbs/$ft^3$; a tapped bulk density of 17 lbs/$ft^3$; a content of greater 98% talc, and less than 2% dolomite and chlorite; and a median particle size of 1.9 microns measured via Sedigraph.

Each of the two talc samples was pressed in a Carver press using a 2.25 inch die at 1,000 psi, 2,000 psi, and 3,000 psi. Thereafter, each of the pressed samples was dispersed in oil with 5 minutes of dispersion time, and a Hegman rating for each of the samples was measured using a wide bar Hegman gauge. The results of the Hegman test for each of the samples is shown below in Table 1. For comparison purposes, the Hegman ratings for each of the samples was taken before applying pressure and is also shown in Table 1.

TABLE 1

| Pressure (psi) | Micro talc | Macro talc |
| --- | --- | --- |
| 0 | 6½ | 4 |
| 1,000 | 6 | 4½ |
| 2,000 | Dirty (not fully dispersed) | 4 |
| 3,000 | — | Dirty (not fully dispersed) |

As can be seen by the Hegman ratings in Table 1, the 4 Hegman Macro talc sample maintained its Hegman rating at 1,000 psi and 2,000 psi pressure, and did not fully disperse when pressed at 3,000 psi. Thus, for the Macro talc sample, application of a limited amount of pressure (e.g., 1,000 psi) did not negatively affect the dispersibility of the Macro talc sample, but application of a higher amount of pressure (e.g., 2,000 or 3,000 psi) resulted in reducing the dispersibility of the Macro talc sample.

Regarding the Micro talc sample, the Hegman rating was modestly impacted when 1,000 psi of pressure was applied to the Micro talc sample, and at 2,000 psi of pressure, the Micro talc sample did not fully disperse. At 3,000 psi of pressure, the Micro talc sample did not disperse sufficiently to determine a Hegman rating. Thus, for the Micro talc sample, application of pressure above 1,000 psi reduced the dispersibility of the Micro talc sample.

In addition, another Macro talc sample was tested. This sample had a median particle size as measured via Sedigraph of 1.4 microns, a loose bulk density of 6 lbs/ft³, and a tapped bulk density of 18 lbs/ft³. When pressed at 1,000 psi and 2,000 psi, this sample had a Hegman rating of 7, and when pressed at 3,000 psi, it had very poor dispersion with oversize up to zero.

Example 2

A finely micronized, macrocrystalline talc powder having a Hegman of 7.5, a moisture content (ISO 787/2) of less than 0.3%, and a median diameter of 1 micron as measured via Sedigraph was processed according to an embodiment of the present invention and according to the following comparative compaction process: The talc powder was added with a sufficient amount of water into a California pellet mill to produce a thick paste that is pushed through a screen and cut to form pellets that are then dried in an industrial dryer to reduce their moisture content to less than 0.3 to 0.5 wt %. The compacted talc also had a bulk density of 40 to 55 lbs/ft³. The pellets were relatively friable and were broken back into coarse particles composed of compacted talc powder during drying or afterwards during further processing.

The dispersibility of the two talc products was evaluated using the following method: A Haake PolyDrive mixer THERMO RHEO 0-120 Nm equipped with 2 cylindrical rotors was set to a temperature of 170° C. and a speed of 70 rpm. 40 grams of polypropylene resin were added to the mixer. Once the polypropylene melted, 10 grams of the talc product was added. Using a SPECAC 15 T hydraulic press equipped with a set of heating plates, a cooling chamber and a thin film kit 0.1 to 0.2 grams of the polymer and talc blend were pressed to form a film. A binocular with magnification of 1 to 6.3, equipped with a 0.5× lens and a diascopic base was set to magnification position 1 (field 44 mm), and talc agglomerates were identified by alternating the film illumination by reflection and transmission. The black particles in transmission revealed as white in reflection were considered to be talc agglomerates. Any coloured particles (pollution) were ignored. Observation was carried out over the whole of the film with the exception of the edging and its internal border over a width of 2 mm. All the talc agglomerates visible at magnification of 1 (field 44 mm) were recorded. The results of these test are shown in Table 2.

TABLE 2

| Samples | Comparative Compacted Talc | Deaerated Talc |
| --- | --- | --- |
| # of Agglomerates | ~500 | <10 |
| Comments | Not dispersed | Fully dispersed |

Figure 2:
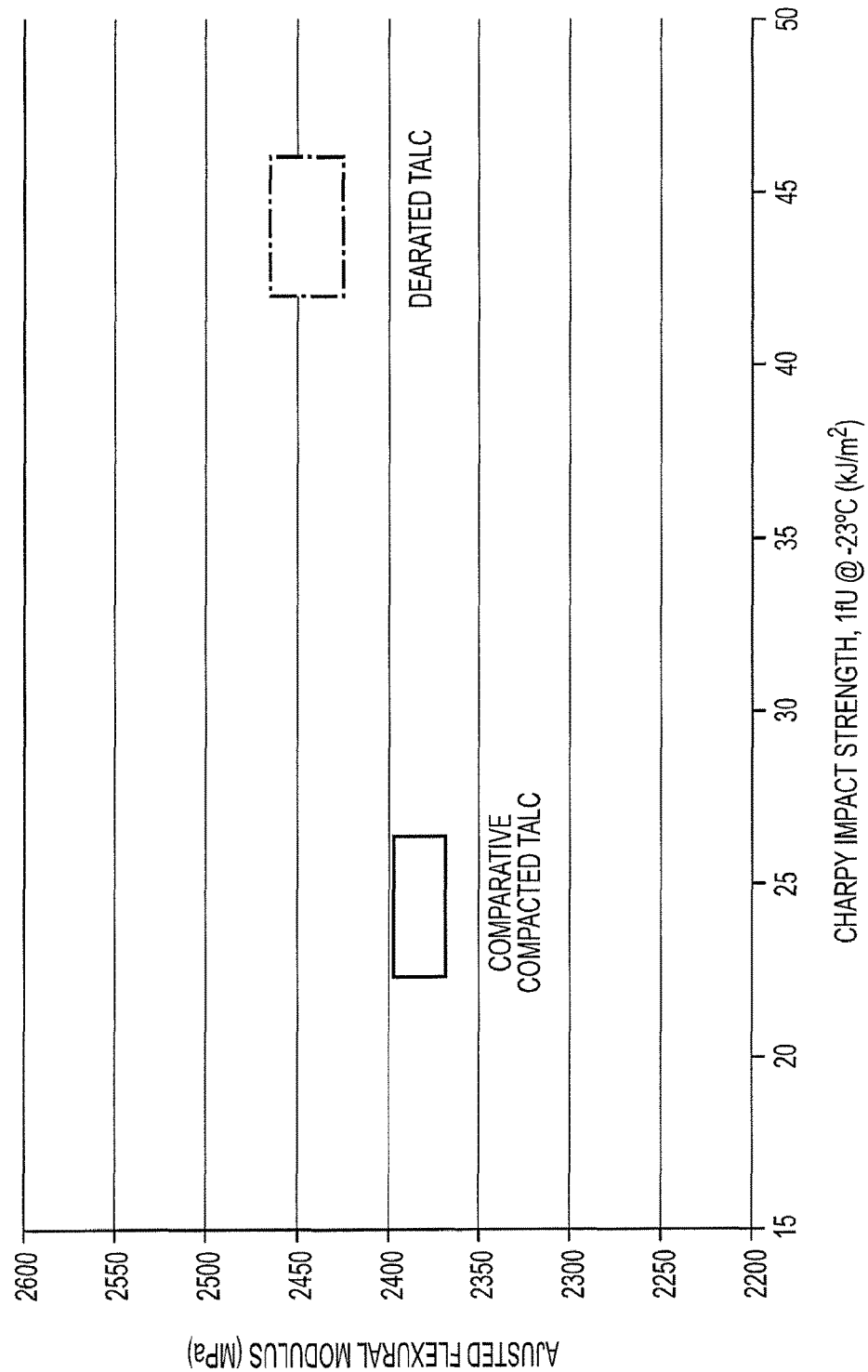
FIG. 2 is a graph of flexural modulus vs. Charpy impact strength for two talc samples.

The flexural modulus and Charpy impact strength were also measured on 80 mm×10 mm×4 mm bars according to ISO 178 and IS 179 (unnotched at −20° C.), respectively. The results of those measurements are shown in FIG. 2.

As indicated by test results, according to some embodiments of the inventive deaerated talc, polymers including the inventive deaerated talc may exhibit in an increased processing throughput rate while substantially maintaining physical properties, for example, when loaded at the same level (e.g., 20%). For example, whereas a polymer including a comparative talc (non-inventive talc) may have a throughput rate of 5 to 10 kg/hour (e.g., 9 kg/hour), a polymer including some embodiments of the inventive deaerated talc may have a throughput rate of from 20 to 25 kg/hour (e.g., 22 kg/hour). Meanwhile, physical properties of the resulting polymer, such as, for example, flexural modulus and impact resistance, may remain substantially unchanged. This improved throughput rate may result from improved dispersion of the inventive deaerated talc.

In addition, according to some embodiments of the inventive deaerated talc, the deaerated talc may be present in the polymer at higher loading levels than comparative talc (non-inventive talc), for example, when processed at the same throughput rate (e.g., 10 kg/hour). For example, some embodiments of the inventive deaerated talc may be loaded at levels greater than 35%, greater than 40%, greater than 45%, greater than 50%, greater than 55%, greater than 60%, greater than 65%, or greater than 70%, substantially without adverse results (e.g., while still maintaining acceptable dispersion in the polymer). In contrast, a comparative talc (non-inventive talc) may be loaded at about 30%.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A composition comprising:
a deaerated talc comprising micronized, talc powder having a Hegman rating of 4.0 or greater.

2. A deaerated talc comprising:
micronized talc powder forming agglomerations measuring 100 millimeters or less, the talc powder having a Hegman rating of 4.0 or greater.

3. The deaerated talc of claim 2, having agglomerations measuring 75 millimeters or less.

4. The deaerated talc of claim 2, having agglomerations measuring 50 millimeters or less.

5. The deaerated talc of claim 2, wherein the talc is compressed at a pressure of less than 2,500 psi.

6. The deaerated talc of claim 5, wherein the talc is compressed at a pressure of less than 500 psi.

7. The deaerated talc of claim 2, wherein when the deaerated talc is dispersed in a polymer to form a polymer composite, the polymer composite has an improved Charpy notch test result relative to a polymer composite including compacted talc dispersed therein.

8. The deaerated talc of claim 2, wherein when the deaerated talc is dispersed in a polymer to form a polymer compound, the polymer compound has reduced white spots relative to a polymer compound including compacted talc dispersed therein.

9. The deaerated talc of claim 2, wherein the deaerated talc has a bulk density of at least 25 lbs/ft$^3$.

10. The deaerated talc of claim 2, wherein the deaerated talc has a bulk density of at least 50 lbs/ft$^3$.

11. The deaerated talc of claim 9, wherein the talc is deaerated via application of force to the talc in at least two directions.

12. The deaerated talc of claim 11, wherein the at least two directions include a first direction and a second direction, and wherein the second direction is transverse to the first direction.

13. The deaerated talc of claim 12, wherein the second direction is substantially perpendicular to the first direction.

14. The deaerated talc of claim 2, wherein the talc is a microcrystalline talc.

15. The deaerated talc of claim 14, wherein the talc has a median particle size less than or equal to 7 microns as measured via Sedigraph.

16. The deaerated talc of claim 2, wherein the deaerated talc is configured to disperse in water without an effective amount of dispersants to form an aqueous talc slurry.

17. The deaerated talc of claim 2, wherein when the deaerated talc is dispersed in pulp for papermaking, the deaerated talc is configured to reduce at least one of pitch and stickies in the pulp relative to pulp not including the deaerated talc dispersed therein.

18. The deaerated talc of claim 2, wherein the deaerated talc has an absorbed moistrure content of less than 1.0% by weight of the deaerated talc.

19. The deaerated talc of claim 2, wherein the deaerated talc has an absorbed moisture content of less than 0.5% by weight of the compressed talc.

20. A deaerated talc product comprising:
the deaerated talc of claim 2; and
a bag containing the deaerated talc.

21. The deaerated talc product of claim 20, wherein the talc is deaerated via application of force to the talc in at least two directions.

22. The deaerated talc product of claim 21, wherein the bag has a longitudinal direction, the at least two directions include a first direction and a second direction, and wherein the first direction is substantially parallel to the longitudinal direction of the bag, and the second direction is transverse to the first direction.

23. The deaerated talc product of claim 22, wherein the second direction is substantially perpendicular to the first direction.

* * * * *